United States Patent [19]
Fox et al.

[11] 3,875,135
[45] Apr. 1, 1975

[54] COMPOSITIONS OF MATTER AND PROCESSES

[75] Inventors: Richard Fox, Rosanna, Victoria; David Gilbert Hay, Balaclava, Victoria, both of Australia

[73] Assignee: ICI Australia Limited, Melbourne, Victoria, Australia

[22] Filed: June 25, 1973

[21] Appl. No.: 373,314

[30] Foreign Application Priority Data
July 11, 1972 Australia.............................. 9654/72

[52] U.S. Cl.................. 260/97, 260/97.5, 260/99.5, 260/100
[51] Int. Cl. ......................... C08h 11/00, C11d 5/00
[58] Field of Search ............ 260/97, 99.5, 97.5, 100

[56] References Cited
UNITED STATES PATENTS
2,346,992  4/1944  Palmer............................... 260/99.5

OTHER PUBLICATIONS
"Encyclopedia of Chemical Technology," Harris, 1953, pp. 800-802 relied on.

*Primary Examiner*—Melvyn I. Marquis
*Assistant Examiner*—William E. Parker
*Attorney, Agent, or Firm*—Cushman, Darby & Cushman

[57] ABSTRACT

A water-repellant adherent coating is provided on the surface of aluminum, copper, iron, magnesium, nickel, tin, zinc and alloys containing same by reacting the surface with a material comprising at least one resin acid or a derivative of the resin acid.

11 Claims, No Drawings

COMPOSITIONS OF MATTER AND PROCESSES

This invention relates to compositions of matter having water repellant properties and particularly relates to compositions of matter comprising metals and rosin or rosin derivatives, and processes whereby such compositions may be prepared.

It is known that certain metals or alloys may be rendered hydrophobic by coating their surface with monobasic acids of the general formula $C_nH_{2n+1}COOH$ derived from natural fats and oils.

Surprisingly we have found that when certain metals or alloys containing such metals are reacted with resin acids, rosin or derivatives thereof there is obtained as a reaction product a composition of matter which is more hydrophobic than the monobasic acid coated metals or alloys referred to above.

Accordingly we provide new compositions of matter having a water repellant surface and comprising the reaction product of at least one metal selected from the group consisting of aluminium, copper, iron, magnesium, nickel, tin and zinc or an alloy containing said metal and a material comprising at least one resin acid or a derivative of said acid. Compositions according to our invention comprising aluminium are preferred. The resin acids referred to above have a typical molecular formula $C_{20}H_{30}O_2$ and are cyclic compounds of the general formula R - COOH wherein R is a group comprising a ring system - usually a three ring system - containing two double bonds. Typical of such resin acids is abietic acid. Other resin acids which may be mentioned include for example levopimaric acid, neoabietic acid, palustric acid, dehydroabietic acid, dihydroabietic acid, tetrahydroabietic acid, pimaric acid, isopimaric acid, $\Delta^{8,9}$ isopimaric acid, elliotinoic acid and sandaracopimaric acid. Abietic acid and derivatives thereof, for example salts thereof such as alkali metal salts are particularly useful. Very suitable compositions of matter are obtained when the metals or alloys referred to above are reacted with a sodium, lithium or potassium salt of abietic acid.

The resin acids referred to above may be prepared synthetically, but it is more usual to obtain them from naturally occurring sources. The most usual source from which they may be obtained is rosin by which we mean a solid resinous material that occurs naturally in the oleoresin of pine trees. Such rosin is a complex mixture of mainly resin acids and a small amount of non-acidic components. It may be modified from its natural state by chemical treatment such as hydrogenation, dehydrogenation, dimerization or polymerization. Both the naturally occurring and modified rosin may be converted to carboxylic acid derivatives or salts of such derivatives. We have found that such rosin in its modified or unmodified forms or derivatives thereof is useful in preparing our compositions of matter.

Accordingly in an embodiment of our invention we provide new compositions of matter having a water repellent surface and comprising the reaction product of at least one metal selected from the group consisting of aluminium, copper, iron, magnesium, nickel, tin and zinc or an alloy containing said metal and rosin or a derivative of said rosin.

In the description set out above reference has been made to a single resin acid, but it will be appreciated that since such resin acids are usually derived from a naturally occurring material, separation of individual acids in a pure form is often difficult and such an acid may contain as an impurity amounts of other resin acids. The use of such impure acids lies within the scope of our invention.

We also provide a process of preparing a new composition of matter as hereinbefore described which process comprises reacting a metal selected from the group consisting of aluminium, copper, iron, magnesium, nickel, tin and zinc or an alloy containing said metal with at least one resin acid or a derivative of said acid. In a further embodiment of our invention we also provide a process which process comprises reacting a metal selected from the group consisting of aluminium, copper, iron, magnesium, nickel, tin and zinc or an alloy containing said metal with rosin or a derivative of said rosin.

The physical form of our compositions of matter may vary widely. Thus the inorganic component may be in the form of sheets, strips, rods, tubes, castings and the like prior to reaction with the organic component. Alternatively the inorganic component may be in the form of powder, pellets or other particulate forms. A very useful form of our composition is one wherein the metallic or alloy component is in a comminuted form for example in the form of a finely divided powder. Methods of converting metals and alloys to such powders are known and a wide range of particle sizes may be obtained. Thus for example the so-called and well known atomized metals may be prepared by spraying molten metal on to a surface and recovering therefrom irregularly shaped particles in finely divided form. If such atomized metals are subjected to a further milling process the degree of subdivision of the metal is increased even further. As a typical example of such finely divided metals there may be mentioned powdered aluminium which is available in a range of particle sizes and certain of these powders pass through a 350 B.S. mesh sieve.

Our compositions of matter may contain any desired amount of resin acid, rosin or derivatives thereof and by a suitable choice of reactants and reaction conditions the desired amount may be achieved. Our compositions have enhanced hydrophobic characteristics in comparison with the elements or alloys from which they were formed, and these characteristics are provided by compositions wherein the proportion of rosin, resin acid or derivatives thereof present in the composition constitutes only a small proportion of the total composition. Dependent on the physical form of the inorganic component and the type of organic component or components in the composition amounts of organic component as low as 0.0005 percent w/w are useful, but it has been found that for most purposes the reactivity of our compositions is adequate if the rosin, resin acid or derivative thereof constitutes an amount in the range from 0.005 to 0.15 percent w/w of the composition. Compositions wherein the organic component constitutes a greater percentage than the percentages referred to above are also useful but we have found that there is but little technical advantage to be gained for many purposes by their use. We have observed that for some compositions the hydrophobicity thereof tends to decrease when the organic component constitutes more than 2 percent w/w of the composition.

The method by which our compositions may be prepared may be varied dependent amongst other things on the nature of the organic component. Thus for example when the organic component is water soluble, for example in the form of a water soluble salt, the reaction may be performed in an aqueous medium at a desirable temperature. Suitably the pH of such an aqueous medium is greater than 7. In some instances such a temperature may be ambient temperature, but for some purposes higher temperatures, say up to about 90°C, may be used. In the instance where the organic component is not water soluble the reaction may be performed in a suitable solvent for example toluene, methanol, ethanol, chloroform or petroleum fractions. Alternatively such components may be used in the form of an emulsion, dispersion or suspension in an aqueous medium comprising suitable adjuvant materials such as emulsifiers, dispersing agents, suspending agents, surfactants and the like. Yet again the organic component may be used in molten form.

The process whereby the compositions of our invention may be prepared can be performed in various ways. Thus the metal or alloy may be reacted with the organic component in the solvent containing the organic components. For example aluminium powder may be reacted with an aqueous solution of sodium abietate for a desired length of time, after which the resultant product may be separated from the reaction mixture by filtration means and dried to provide aluminium powder having modified surface properties. Alternatively an emulsion of the organic component may be sprayed on to an agitated bed of powdered inorganic material; the volatile components of the emulsion evaporated from the treated powder; and after a time sufficient to ensure reaction between the components the desired product is recovered. Yet again a spray of molten rosin or a derivative thereof may be applied to the inorganic component, preferably in a heated state and the mixture of rosin and metal or alloy is then agitated for a time sufficient to allow reaction to occur. The temperature at which the reaction may be performed will vary depending on the form of the organic component and the solvent, if any, in which it is dissolved or dispersed. Thus when the organic component is dissolved or dispersed in aqueous media temperatures in the range from ambient temperature to about 90°C are convenient. Where an organic solvent is used the temperature may suitably be up to the reflux temperature of the solution. When it is desired to use molten rosin or a derivative thereof the temperature should be sufficient to maintain the rosin or derivative in the molten state at least until it is applied to the surface of the inorganic component. The temperature of such molten material should be below the decomposition temperature of the rosin or derivative, but may, if desired, be of sufficient magnitude such that at least a part of the rosin or derivative is in vaporized form.

The nature of the reaction in our process between the inorganic and organic components is not clearly understood but, whilst we do not wish to be bound by theoretical considerations, the modification of the surface of the inorganic component would seem to occur as the result of, for example, the reaction of an oxide layer on the initial surface with a portion of the organic component. Thereafter the residual organic material appears to become bonded to the freshly exposed surface of the inorganic component.

The products of our invention have excellent hydrophobic characteristics and thus may be used when it is desired to use such elements or alloys for purposes in which they are exposed to attack by water.

Thus compositions of matter as hereinbefore described, particularly compositions comprising iron or alloys containing iron, are resistant to corrosion in aqueous media. For example iron or steel articles in the form of plates, sheets, strips, rods, tubes and the like may be treated by our processes as hereinbefore described to provide articles which have enhanced resistance to corrosion, for example rusting, by aqueous media.

Accordingly in yet another embodiment of our invention we provide a process for the manufacture of corrosion resistant articles comprising iron or steel which process comprises reacting an article comprising iron or steel with at least one material selected from the group consisting of resin acids, rosin and derivatives thereof.

Certain products of our invention are also useful in the manufacture of concrete and cement. It is known that the incorporation of aluminium into cement mixtures results in aeration of the final product.

We have found that the products of our invention provide an unexpected increase in the degree of aeration in cement. Thus for example a cement composition having, after setting, a density of about 2.1 gm/cc can be aerated so as to have a density after setting of about 1.4 gm/cc by incorporating about 0.5 percent w/w of a finely divided aluminium powder into the composition. We have found if there is used certain products according to our invention derived from the same aluminium and comprising about 0.005 to 0.15 percent w/w of resin acids then the density of the resultant product is reduced by about an additional 10 percent. It is surprising that such a reduction in density is obtained by use of our modified metal powders especially when it is realized that the resin content of the exemplified composition is of the order of 0.0005 percent w/w. There is the attendant advantage that because of the enhanced activity of our products in promoting aeration it is now possible to obtain the same degree of aeration using lesser amounts of our modified products than the amounts of similar unmodified materials used previously. Yet again it is now possible to obtain similar degrees of aeration by using coarser particles of aluminium. Thus for example a modified atomized aluminium powder may be used to replace the conventional, and more hazardous, so called paint fine aluminium powders.

Accordingly we provide in a composition comprising cement and an aerating agent, the improvement consisting of an aerating agent comprising the reaction product of aluminium or an alloy containing aluminium and a material comprising at least one resin acid and or a derivative of said acid.

Our invention is now illustrated by, but in no way limited to, the following examples wherein all parts and percentages are on a weight basis unless otherwise specified. Examples 2, 30, 33 and 34 are included for the purpose of comparison and are not within our invention.

EXAMPLE 1

To 100 ml of an aqueous 0.05% solution of sodium abietate there was added 10 gm of aluminium powder. The mixture which had a pH of 10.9 was stirred for 10 minutes at 25°C and the resultant solid product was separated from the reaction mixture by filtration and thereafter dried at room temperature for a period of 2 days. The resultant dried product was in the form of finely divided hydrophobic particles. 0.01 g of sodium abietate had been removed from the solution during the reaction. A 0.2 g portion of the product prepared above was spread as evenly as possible on to the surface of 50 ml of water in a beaker and after four hours it was observed that the product had remained substantially on the surface of the water.

EXAMPLE 2

For the purposes of comparison a 0.2 g portion of the unreacted aluminium powder used in Example 1 was placed on the surface of 50 ml of water in a beaker. It was observed that almost immediately the majority of the aluminium had sunk to the bottom of the beaker. In a further similar comparative test using aluminium powder surface coated with a sodium alkyl sulphate, it was found that, whilst the initial hydrophobic properties were good, a considerable proportion of the treated powder had sunk to the bottom of the beaker after 40 minutes.

EXAMPLE 3

The general procedure of Example 1 was repeated but the aluminium powder of that Example was replaced by 10 g of powdered iron. 0.007 g of sodium abietate was removed from the solution during the reaction. The hydrophobic characteristics of the product were similar to those of the product of Example 1. It was observed that there was no rust formation until the product had been in contact with the water for 4 days.

EXAMPLE 4

The general procedure of Example 1 was repeated but the aluminium powder of that Example was replaced by 10 g of a very finely divided non-hydrophobic aluminium powder 99% of which passed through a 350 B.S. mesh sieve. The solution of sodium abietate used in Example 1 was replaced by a similar solution of potassium abietate. The product so obtained had hydrophobic properties similar to those of the product of Example 1.

EXAMPLE 5

The general procedure of Example 4 was repeated but the potassium abietate of that Example was replaced by a similar amount of lithium abietate. The product so obtained had hydrophobic properties similar to those of the product of Example 4.

EXAMPLE 6

The general procedure of Example 4 was repeated but the potassium abietate of that Example was replaced by a similar amount of a material prepared by the saponification of a commercially available wood rosin by sodium hydroxide. The product so obtained had hydrophobic properties similar to those of the product of Example 4.

EXAMPLE 7

The general procedure of Example 4 was repeated but the potassium abietate of that Example was replaced by a similar amount of a material prepared by the saponification with sodium hydroxide of a dimerised rosin available commercially under the Trade Name of "Dymerex" rosin from A C Hatrick Chemicals Pty Ltd of Melbourne Australia. The product so obtained had hydrophobic properties similar to those of the product of Example 4.

EXAMPLE 8

The general procedure of Example 4 was repeated but the potassium abietate of that Example was replaced by a similar amount of a material prepared by the saponification with sodium hydroxide of a polymerized rosin available commercially under the Trade Name of "Polypale" from A C Hatrick Chemicals Pty Ltd of Melbourne, Australia. The product so obtained had hydrophobic properties similar to those of the product of Example 4. The amount of saponified polymerized rosin removed from the solution during the reaction was approximately 0.0095 g expressed as sodium abietate.

EXAMPLE 9

The general procedure of Example 8 was repeated but the aluminium of that Example was replaced by 10 g of a non-hydrophobic atomized aluminium powder having the following sieve analysis: 18 percent particles retained on a 36 B.S. mesh sieve; 50 percent of particles retained on a 60 B.S. mesh sieve; 85 percent of particles retained on a 100 B.S. mesh sieve; and 99 percent of particles retained on a 150 B.S. mesh sieve. Analysis showed that the amount of saponified resin removed from the solution during the reaction was approximately 0.0004 g. After 4 hours about 70 percent of the aluminium remained on the surface of the water when the product was submitted to the hydrophobicity test described in Example 1.

EXAMPLE 10

The general procedure of Example 8 was repeated but the aluminium powder of that Example was replaced by a non-hydrophobic atomized aluminium powder wherein all the particles passed a 72 B.S. mesh sieve; 46 percent of the particles were retained on a 100 B.S. mesh sieve; and 95 percent of the particles were retained on a 150 B.S. mesh sieve. The product so obtained had water repellant properties similar to those of the product of Example 9.

EXAMPLE 11

The general procedure of Example 8 was repeated but the aluminium of that Example was replaced by a non-hydrophobic aluminium powder wherein 6 percent of the particles were retained on a 60 B.S. mesh sieve; 29 percent of the particles were retained on a 100 B.S. mesh sieve; and 89 percent of the particles were retained on a 150 B.S. mesh sieve. After 4 hours no particles had sunk to the bottom of the beaker when the product was submitted to the hydrophobicity test described in Example 1.

EXAMPLE 12

The general procedure of Example 8 was repeated but the aluminium of that Example was replaced by a non-hydrophobic aluminium powder wherein all the particles passed a 150 B.S. mesh sieve; 3 percent of the particles were retained on a 240 B.S. mesh sieve; and 25 percent of the particles were retained on a 300 B.S. mesh sieve. The hydrophobic characteristics of the product so obtained were similar to those of the product obtained in Example 8.

EXAMPLE 13

The general procedure of Example 6 was repeated but the solution of the saponified wood rosin of that Example was replaced by a similar solution of a material prepared by the saponification with sodium hydroxide of a 60 percent hydrogenated rosin available commercially under the Trade Name of "Staybelite." The product so obtained had hydrophobic characteristics similar to those of the product of Example 6.

EXAMPLE 14

Using the general procedure of Example 1 10 g of the aluminium powder described in Example 4 was reacted with 100 ml of a 0.05 percent solution of abietic acid in 95 percent ethanol. The product so obtained had hydrophobic properties similar to those of the product of Example 1.

EXAMPLE 15

The general procedure of Example 14 was repeated but the ethanol-water mixture of that Example was replaced by toluene. The product so obtained had water repellant properties similar to those of the product of Example 14.

EXAMPLE 16

The general procedure of Example 14 was repeated but the ethanol-water mixture of that Example was replaced by chloroform. The product so obtained had hydrophobic properties similar to those of the product of Example 14.

EXAMPLE 17

The general procedure of Example 16 was repeated but the 0.05 percent solution of abietic acid in chloroform used in that Example was replaced by a 0.05 percent solution of "Staybelite" resin in chloroform. The product so obtained had hydrophobic properties similar to those of the product of Example 16.

EXAMPLE 18

The general procedure of Example 17 was repeated but the chloroform used in that Example was replaced by the so-called white spirit which is a petroleum fraction having a boiling range from 50° to 65°C comprising a high proportion of aliphatic hydrocarbons with a small proportion of aromatic hydrocarbons. The product so obtained had hydrophobic properties similar to those of the product of Example 17.

EXAMPLE 19

The general procedure of Example 17 was repeated but the chloroform used in that Example was replaced by methanol. The product so obtained was similar to that obtained in Example 17.

EXAMPLES 20 TO 24 INCLUSIVE 10 gm of a non-hydrophobic aluminium powder - 99 percent of which passed through a 350 B.S. mesh sieve - was stirred for 1 minute at 30°C with 100 ml of aqueous solutions of sodium abietate as set out in Table 1. The resultant solid product was separated from the reaction mixture by filtration and thereafter dried at room temperature for 2 days. The particulate material was tested for hydrophobicity by the general procedure of Example 1 and the results obtained, as set out in Table 1, show the percentage of the product remaining on the surface of the water after 24 hours. The amount of sodium abietate which reacted with the aluminium, as determined by difference by analysis of the residual aqueous solution, is also set out in Table 1.

TABLE 1

| Example No. | Concentration of sodium abietate in solution % | Weight of sodium abietate which reacted with the aluminium gm | Product on water surface after 24 hours % |
|---|---|---|---|
| 20 | 0.0001 | 0.000076 | 11 |
| 21 | 0.001 | 0.00043 | 19 |
| 22 | 0.01 | 0.0027 | 99 |
| 23 | 0.1 | 0.015 | 92 |
| 24 | 1.0 | 0.143 | 29 |

EXAMPLE 25

10 g of fine magnesium filings were reacted with 100 ml of an aqueous 0.005 percent solution of sodium abietate for 1 minute at room temperature. The resultant solid product was separated from the reaction mixture by filtration and dried at room temperature for 2 days. The particulate material so obtained was tested for hydrophobicity by the general procedure of Example 1. After 4 hours approximately 80 percent of the product remained on the surface. 0.002 g of sodium abietate had reacted with the magnesium.

EXAMPLES 26 TO 29 INCLUSIVE

The general procedure of Example 1 was repeated but the aluminium powder of that Example was replaced by non-hydrophobic powdered metals as set out in Table 2. The products so obtained exhibited good water repellant properties after having been in contact with water for 3 days.

TABLE 2

| Example No. | Metal |
|---|---|
| 26 | Copper |
| 27 | Tin |
| 28 | Nickel |
| 29 | Zinc |

EXAMPLE 30

For the purposes of comparison the general procedure of Example 1 was repeated but the aluminium powder of that example was replaced by non-hydrophobic powdered titanium. The product so obtained showed no water repellant properties.

EXAMPLE 31

A strip of spring steel was immersed in an aqueous 0.05 percent solution of sodium abietate for one hour at room temperature. The treated strip was removed from the solution, dried in air and then immersed in water. No rust formed on the surface of the strip after 4 days immersion. By comparison a similar strip of spring steel which had not been treated as described above was rusty after it had been immersed in water for 2 hours.

EXAMPLE 32

The general procedure of Example 13 was repeated but the "Staybelite" solution of that example was replaced by 100 ml of an aqueous 0.05 percent solution of a material prepared by the saponification with sodium hydroxide of a fully hydrogenated rosin available commercially under the trade name of "Foral" AX. During the reaction period 0.01 gram of the rosin was removed from the solution. When the resultant product was tested for hydrophobicity by the general procedure of Example 1 it was found after 24 hours that 99 percent of the product still remained on the surface of the water.

EXAMPLE 33

A block of cement was prepared for the purposes of comparison by mixing 119 parts of cement, 713 parts of rock dust and 162 parts of water. The mixture was transferred to an unconfined container and allowed to stand for 100 hours. The density of the resultant block was 2.08 gm/cc.

EXAMPLE 34

The general procedure of Example 33 was repeated but for the purposes of comparison 6 parts of a non-hydrophobic aluminium powder 99 percent of which passed through a 350 mesh sieve was incorporated in the mixture. The density of the resultant block was 1.399 gm/cc.

EXAMPLE 35

The general procedure of Example 34 was repeated but the aluminium powder of that Example was replaced by 6 parts of the product of Example 32. The density of the resultant block was 1.279 gm/cc.

We claim:

1. A process for modifying the surface of a metal selected from the group consisting of aluminum, copper, iron, magnesium, nickel, tin and zinc and alloys containing said metal comprising reacting said surface with a material comprising at least one resin acid or a derivative of said acid for a sufficient period of time such that the resultant reaction product forms a water-repellant surface layer on said surface.

2. A process as in claim 1 wherein said material comprises rosin or a derivative of said rosin.

3. A process as in claim 1 wherein said material is selected from the group consisting of saponified rosin, dimerized rosin, polymerized rosin and hydrogenated rosin.

4. A process as in claim 1 wherein said material comprises abietic acid or a derivative thereof.

5. A process as in claim 4 wherein said material comprises an alkali metal salt of abietic acid.

6. A process as in claim 5 wherein said material comprises sodium abietate.

7. A process as in claim 1 wherein said metal is in a comminuted form.

8. A process as in claim 7 wherein said comminuted metal is aluminum powder.

9. A metal selected from the group consisting of aluminum, copper, iron, magnesium, nickel, tin and zinc and alloys containing said metal having a water-repellant adherent surface coating of the reaction product of the respective metal with a material comprising at least one resin acid or a derivative of said acid.

10. A metal as in claim 9 in particulate form.

11. Aluminum in particulate form surface treated with a material comprising at least one resin acid or a derivative of said acid so as to form a coating on the aluminum particles which is a reaction product of said material with aluminum.

* * * * *